(12) United States Patent
Henne

(10) Patent No.: US 10,426,090 B2
(45) Date of Patent: Oct. 1, 2019

(54) FORAGE HARVESTER MATERIAL APPLICATOR SYSTEM AND RELATED METHOD

(71) Applicant: Michael P. Henne, Grand Rapids, MI (US)

(72) Inventor: Michael P. Henne, Grand Rapids, MI (US)

(73) Assignee: Great Lakes Forage Systems, LLC, Grand Rapids, MI (US)

( * ) Notice: Subject to any disclaimer, the term of this patent is extended or adjusted under 35 U.S.C. 154(b) by 130 days.

(21) Appl. No.: 15/877,424

(22) Filed: Jan. 23, 2018

(65) Prior Publication Data

US 2019/0223381 A1    Jul. 25, 2019

(51) Int. Cl.
| | |
|---|---|
| A01D 43/14 | (2006.01) |
| A01F 15/08 | (2006.01) |
| A01D 43/08 | (2006.01) |
| A01D 43/07 | (2006.01) |
| A01D 41/127 | (2006.01) |

(52) U.S. Cl.
CPC .......... *A01D 43/14* (2013.01); *A01D 41/127* (2013.01); *A01D 43/07* (2013.01); *A01D 43/085* (2013.01); *A01F 15/0816* (2013.01)

(58) Field of Classification Search
CPC .... A01D 43/085; A01D 43/14; A01F 15/0816
See application file for complete search history.

(56) References Cited

U.S. PATENT DOCUMENTS

| | | | |
|---|---|---|---|
| 2,757,598 A | 8/1956 | West | |
| 2,787,208 A | 4/1957 | Russell | |
| 3,059,566 A | 10/1962 | Grau | |
| 6,988,352 B2 | 1/2006 | Van Vooren | |
| 7,300,003 B1 | 11/2007 | Kreikemeier | |
| 7,874,133 B2 | 1/2011 | Depestel | |
| 2002/0124541 A1 | 9/2002 | Oepping et al. | |
| 2003/0006312 A1 | 1/2003 | Dohrmann et al. | |
| 2003/0201333 A1 | 10/2003 | Oepping et al. | |

(Continued)

FOREIGN PATENT DOCUMENTS

GB    2527046    12/2015

OTHER PUBLICATIONS

455 Pneumatic Granular Innoculant Applicator Operator's Manual, Valmar Airflo Inc., Publication Date Feb. 1998.

*Primary Examiner* — Alicia Torres

(74) *Attorney, Agent, or Firm* — Warner Norcross + Judd LLP

(57) ABSTRACT

A system and related method of applying forage treatment material to harvested forage. The method can include harvesting forage, rotating an auger in a bin to convey a granular treatment material toward a tube, moving the material through the tube with a vacuum toward harvested forage moving in a chute to mix the material with the harvested forage, sensing rotation of the auger; displaying an RPM associated with the sensed auger rotation; displaying a measured harvested forage rate; adjusting the actuator to change the RPM to match the applied material amount to the harvested forage based on the measured harvested forage rate. The system can include a bin having an auger, a sensor that measures auger RPM, a tube, a display that displays the RPM in the cab, and an actuator to adjust applied material by changing the RPM based on a measured harvested forage rate.

20 Claims, 5 Drawing Sheets

(56) References Cited

U.S. PATENT DOCUMENTS

| | | |
|---|---|---|
| 2005/0077389 A1 | 4/2005 | Lebeda et al. |
| 2011/0120071 A1 | 5/2011 | Freeman et al. |
| 2011/0167777 A1 | 7/2011 | Dohrmann |
| 2012/0090287 A1 | 4/2012 | O'Daniel |

FORAGE HARVESTER MATERIAL APPLICATOR SYSTEM AND RELATED METHOD

BACKGROUND OF THE INVENTION

The present invention relates to forage harvesters, and more particularly to a material applicator system and related method to precisely apply treatment material to crops harvested by a forage harvester.

In the farming industry, when crops are harvested, it is frequently helpful to apply additives, for example, chemical or biological treatments such as preservatives to those crops, also referred to as forage herein, to improve, preserve or maintain the feed or other value of the forage. Applying the additive materials in the correct amounts can be a challenge because the rate of harvesting varies with factors such as the particular forage harvester used in the harvest, the speed and operation of the harvester, the crop quality and its density. Adding incorrect amounts of additives can lead to a waste of expensive additives and/or deterioration of the harvested forage when it is stored.

Accordingly, there remains room for improvement in the field of forage harvesting and related equipment.

SUMMARY OF THE INVENTION

A system and related method of precisely applying forage treatment material to harvested forage is provided.

In one embodiment, the system can include a bin that contains an amount of granular treatment material, an auger in the bin that rotates to move the granular treatment material out of the bin, a sensor that measures the revolutions per minute (RPM) of the auger, a tube that conveys the granular treatment material from the bin to moving harvested forage, a display that displays the auger RPM, and an actuator to adjust the amount and/or rate of treatment material by changing the RPM based on a measured harvested forage rate to precisely match applied treatment material to the amount of harvested forage.

In another embodiment, the bin can gravity feed a supply of the granular treatment material to the auger in a bottom of the bin. The granular treatment material can include a particulate material, such as sand, mixed with a preservative and/or bacteria. Generally, the granular treatment material can consist of solids and can flow, and optionally is not in liquid form.

In a further embodiment, the system can be mounted on a motorized forage harvester capable of conveying itself along the ground. The bin, auger and a motor that rotates the auger can be mounted on a platform adjacent an operator cab of the harvester, or other locations, depending on the harvester. The harvester can include an engine, a body driven by the engine, a cutting head forward of the body, and an ejector chute that propels the harvested forage from the motorized forage harvester along a trajectory through the air toward a container distal from the motorized forage harvester.

In yet a further embodiment, the tube of the system can extend from a location adjacent an exit opening of the bin to a vacuum source generated by the motorized forage harvester. The vacuum source can draw a vacuum to pull the granular treatment material dumped out the exit opening of the bin toward a flow or moving mass of harvested forage so that the granular treatment material can be mixed with the harvested forage.

In still a further embodiment, the sensor can be mounted proximal the shaft of the auger to sense rotation of the shaft as a motor rotates the shaft about an axis. Optionally, the sensor is a tachometer placed adjacent the shaft, and in communication with a controller. The sensor can relay signals relating to the RPM of the shaft to the controller, and the controller can translate these signals to RPMs, and optionally output the same on a display joined with and/or integral with the controller.

In even a further embodiment, the controller can be mounted in the cab in a location where the operator of the harvester can read a display on the controller, and manually manipulate an actuator on the controller. The display can output or display auger RPM in alphanumeric form in the cab to the operator.

In another embodiment, the system can include a chart, viewable from an operator inside a cab of the motorized forage harvester. The chart can display to the operator in the cab, multiple auger RPMs associated with multiple corresponding theoretical harvest forage rates. This association can be relationships between the theoretical harvest forage rate and the auger RPMs such that the system applies a preselected amount of treatment material to the harvested forage as that forage is being harvested. The preselected amount can match the harvest forage rate so that the material is not wasted by applying too much of it, and is effective so that enough of it is applied to adequately treat the harvested forage.

In yet another embodiment, the system includes the actuator. The operator can manually adjust the actuator based on a review of the chart to match the measured harvested forage rate to a closest theoretical harvest forage rate from the plurality of theoretical harvest forage rates, and the RPM associated with that closest theoretical harvest storage rate. The adjustment in this case can set the auger RPM to a value that is as close to the actual measured harvested forage rate to apply the correct amount of treatment material. Optionally, the actuator can be adjusted to a setting to selectively adjust the motor joined with the shaft of the auger so that the auger RPM changes from a first RPM to a second RPM that is different from the first RPM. The second RPM can be associated with the closest theoretical harvest forage rate.

In still another embodiment, the system is configured so that the operator can adjust the actuator to alter an RPM of the auger shaft to apply a predetermined amount of the granular treatment material to the harvested forage based on a measured harvest forage rate displayed inside the cab, optionally on a separate display inside the cab.

In yet another embodiment, a method is provided including: harvesting forage; rotating an auger in a bin to convey a granular treatment material toward a tube; moving the material through the tube with a vacuum toward harvested forage to mix the material with the harvested forage; sensing rotation of the auger; displaying an RPM associated with the sensed auger rotation; displaying a measured harvested forage rate; and adjusting the actuator to change the RPM to match the applied material amount to the harvested forage based on the measured harvested forage rate.

The current embodiments of the system and related method of applying forage treatment material to harvested forage provide benefits in crop treatment that previously have been unachievable. For example, forage treatment material can be precisely metered and applied to harvested forage on the fly, as the forage is harvested. An operator can readily and easily translate a measured rate of harvest to a given parameter, for example auger RPM, to precisely control the system and apply a treatment material to harvested forage. In operation, the system and method can effectively apply the treatment material in correct or adequate amounts regardless of the volume of crops harvested, the rate of harvest, the density of the crop, the type of crop, humidity, oxygen and plant moisture content, the condition of the harvester, the field conditions and other variables. This can conserve treatment material, reduce overall spend on that material, and yet ensure that the forage treated with the material is properly treated to maintain the value of the harvested forage.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
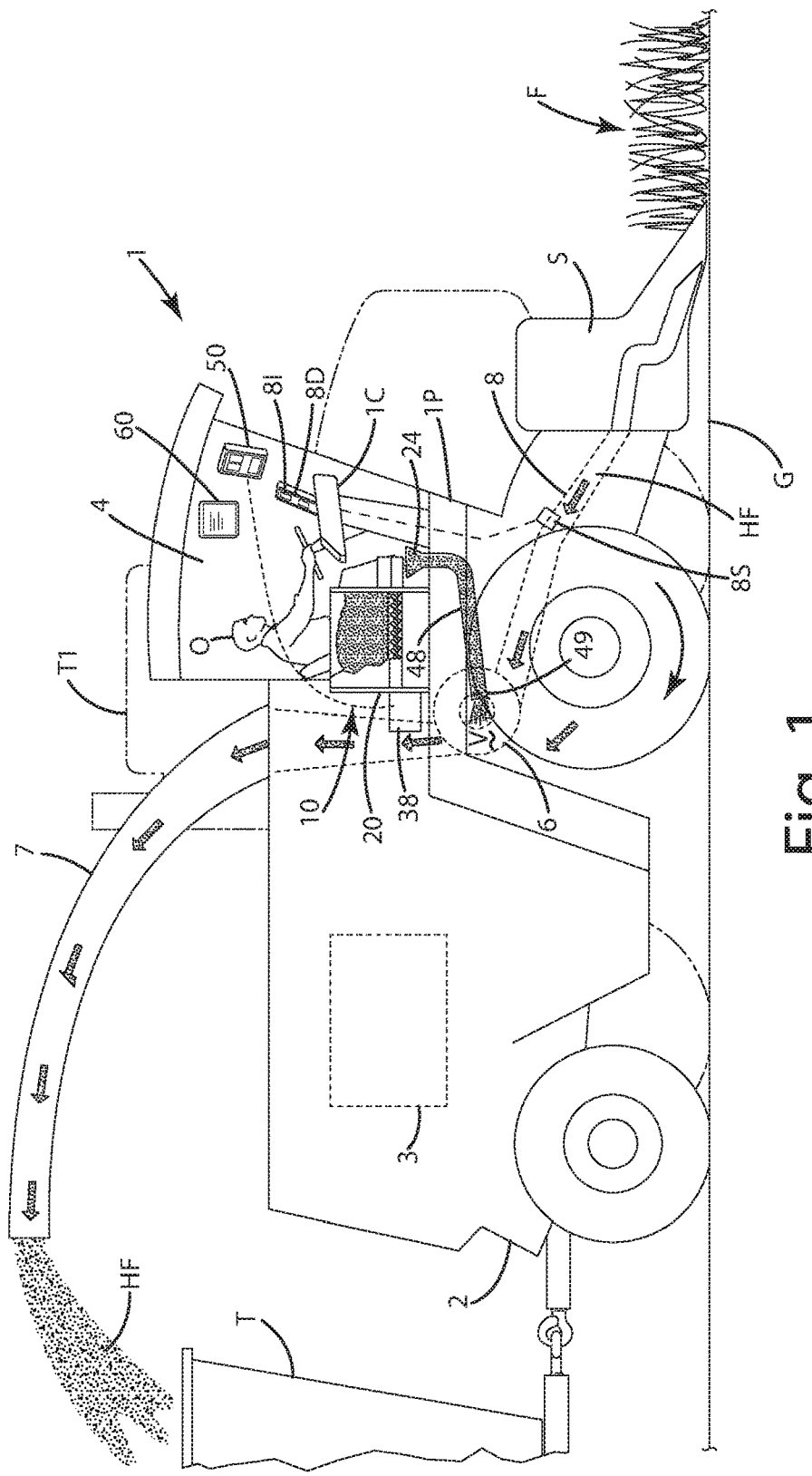
FIG. 1 is a side view of a forage harvester harvesting forage in a field while an agricultural forage treatment applicator system of a current embodiment applies forage treatment material to the forage as the forage harvesting is ongoing.

A current embodiment of the agricultural forage treatment applicator system is illustrated in FIGS. 1-4, and generally designated 10. The applicator system 10 is mounted on a forage harvester 1, which can be a motorized forage harvester capable of harvesting forage F from a field G as the harvester 1 moves along the ground in the field F under power provided by an engine 3 of the harvester 1. Of course, this system can also be utilized with other types of forage harvesters that may or may not be motorized. The harvester may come in the form of a pull behind trailer that is not motorized, but rather pulled by another motorized implement such as a tractor or truck. The current embodiment of the system 10 will, however, be described in conjunction with a motorized forage harvester.

The system 10 also will be described in conjunction with the harvest of forage F. Forage F can be any type of crop, for example alfalfa, corn, wheat, sorghum, and any other type of crop, such as grains, grasses, legumes and the like. Further, the system 10 will be described in conjunction with the dispensation and application of a generally dry, granular treatment material 100. This granular treatment material optionally can comprise a particulate matter that is coated with, admixed with or otherwise joined or associated with a chemical and/or biological material, for example, a preservative and/or one or more bacteria strains. As another example, the particulate matter can be in the form of sand or a silica-based or inert, nontoxic carrier type dry material having low or no moisture content. The material can be coated with and/or mixed with a preservative such as potassium sorbate. The treatment material, for example the particulate matter, also can be admixed with a powder or have coated thereon or otherwise associated there with one or more bacteria strains in a dormant, non-multiplying form. Optionally, one, two, three or more types of bacteria strains can be included in the treatment material. These bacteria strains can be fermenting bacteria, such as lactic acid producing bacteria and/or other silage fermentation organisms. The treatment material optionally can include enzymes, such as cellulases, amylases, hemicellulases, pectinases and xylanases, or other ingredients that facilitate the breakdown of organic compounds of the forage into substances that animals and microbes can use as a source of nutrients. Further optionally, the treatment material can include glucose or molasses as a source of sugar to stimulate bacterial action to get the bacteria to start fermentation immediately. It will be appreciated that although the granular treatment material described herein can be a type of preservative, other types of biological, chemical or other types of treatment materials can be applied to the forage with the applicator system herein.

Figure 2:
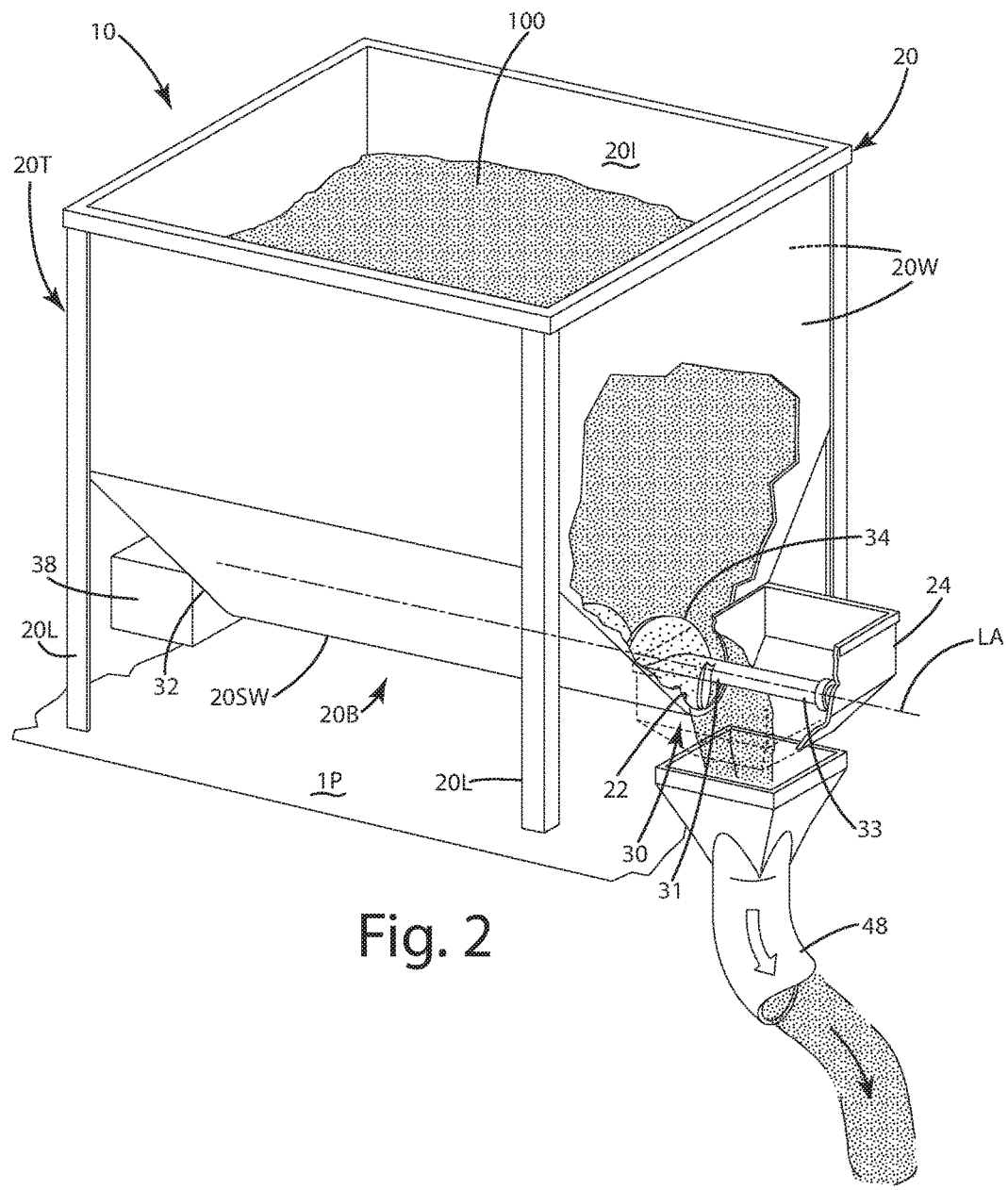
FIG. 2 is a perspective view of a bin, motor, auger and tube of the forage applicator treatment system.
Figure 3:
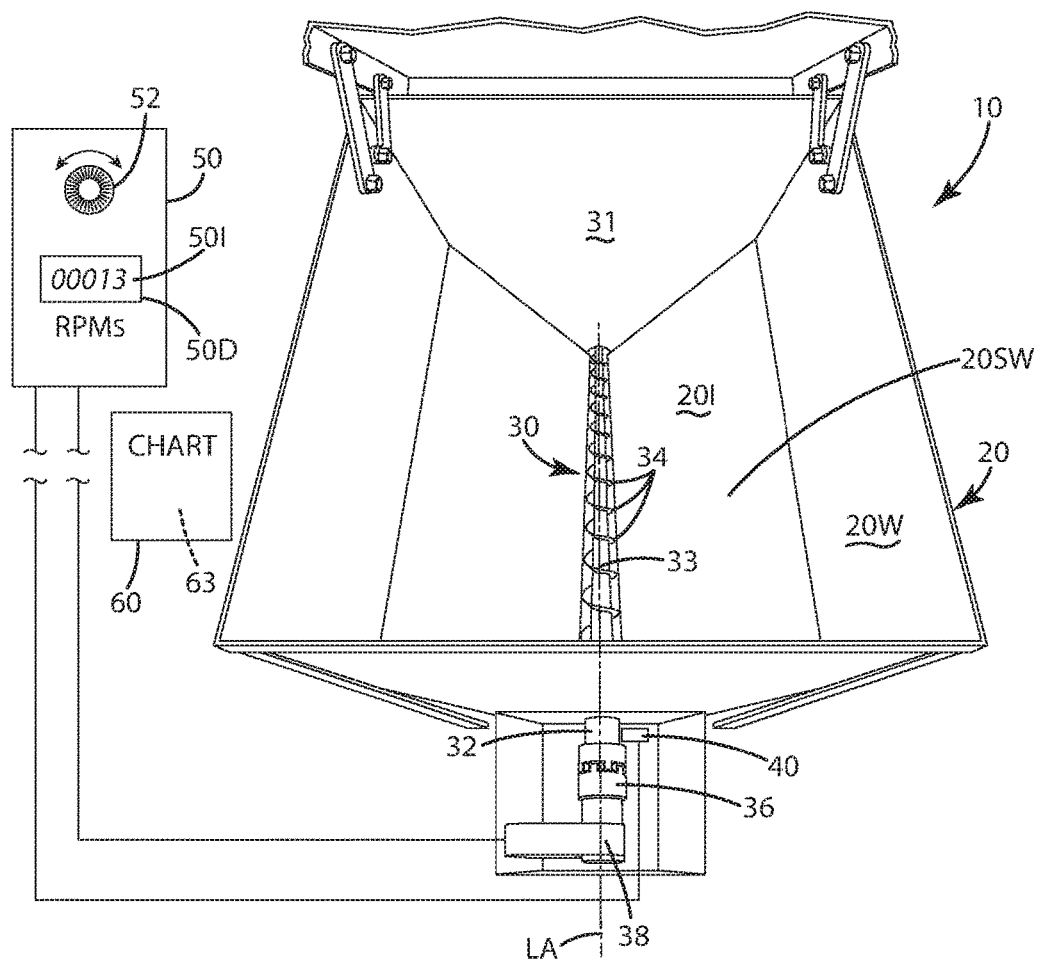
FIG. 3 is a top view of the bin, motor and auger, as well as a sensor, a controller and a chart associated with the forage applicator treatment system.

With reference to FIGS. 1-3, the system 10 can be mounted on the motorized forage harvester 1. The harvester 1 can be a forage chopper powered by an engine 3. The engine 3 can be mounted in a body 2 of the harvester. The engine can power wheels to move the harvester 1 along the ground in a field G in which the forage F grows. The engine 3 also can run a powerful fan 6, also referred to as an accelerator or a blower, which is in fluid communication with a chute 8. Examples of such fans are described in U.S. Pat. No. 7,874,133 to Depestel and U.S. Pat. No. 6,988,352 to Van Vooren, which are hereby incorporated by reference in their entirety. The fan can be similar in construction to a squirrel cage fan. The fan 6 can itself form a portion of the chute and can be disposed in a portion of the chute or otherwise joined with the chute. The fan can be configured to draw a vacuum V within itself and/or in the chute 8 that conveys chopped forage HF from the chopper head 5 optionally to the ejector chute 7, sometimes referred to as the discharge spout. From the ejector chute 7, the chopped forage HF is propelled along a trajectory as shown in FIG. 1 to another container T. The container T optionally can be in the form of a trailer pulled by another piece of equipment T1, which can be a truck, tractor or other motorized vehicle. Of course, the container can be distal from the harvester 1 but a sufficient distance so the chopped forage HF can be propelled from the ejector chute 7 into the container T. Further, any type of container can be used in conjunction with a harvester. In some cases, the container optionally can be pulled behind the harvester. As shown however the container T can be pulled by another implement or piece of equipment in the field.

As mentioned above, the fan 6 draws a vacuum V in the forage chute 8. Of course, although shown as being pulled by a fan 6, the vacuum V can be drawn by any type of vacuum source or a type of material blower that blows material and that is suitable for mounting on the harvester 1. This vacuum V pulls the harvested forage material HF through the chute 8. The chute 8 can be outfitted with a flow sensor 8S that senses the flow of the harvested forage material HF through the chute. The sensor 8S sends a signal to a machine controller 1C mounted in the cab 4 of the harvester 1. This machine controller 1C can convert the signal to perform certain calculations to output information on a display within the cab 4 visible to the operator O. For example, the machine controller 1C can display indicia 8I to the operator O in the cab 4. The indicia 8I can be output by the controller and can be representative of a measured harvest forage rate of forage material HF harvested by the harvester 1. The controller can perform calculations to determine the measured harvest forage rate, which is output on as indicia 8I on the display 8D. This indicia can represent the measured harvested forage rate as an amount of forage harvested per unit of time, optionally in alphanumeric form. As the one example, the indicia 8I can be displayed on the display 8D as XX tons per minute. This harvest rate represents the rate at which the harvester 1 is chopping and harvesting forage, sending it through the chute 8 in a moving form. In some cases, the measured harvest rate can optionally be 1, 2, 3, 4, 5, 6, 7, 8, 9, 10, 15 or 20 tons per minute, or more or less, or increments thereof. This measured harvested forage rate can be calibrated by measuring the precise amount of forage harvested, and can be based on the field conditions, the harvester and a variety of other parameters.

Figure 5:
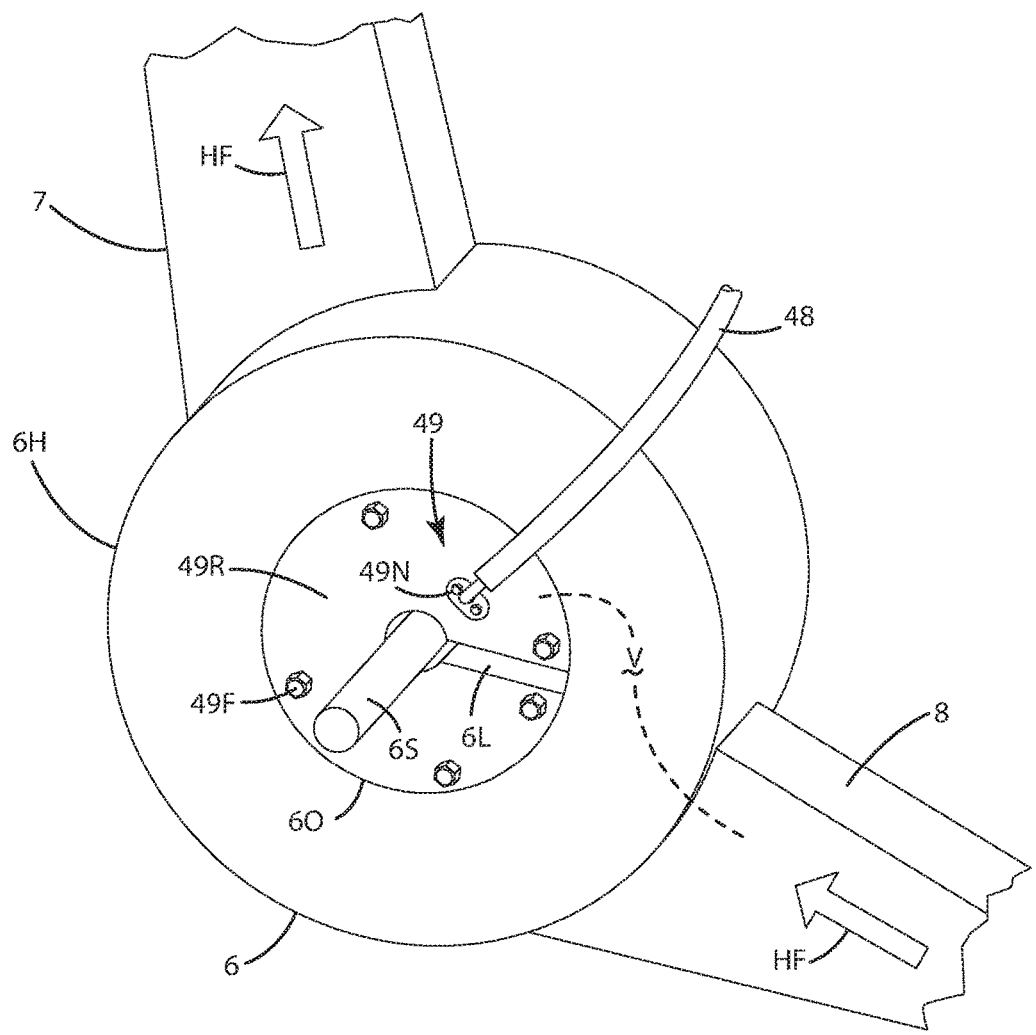
FIG. 5 is a side view of a fan and optional restrictor plate of the applicator treatment system.

With regard to the fan 6 and the vacuum V that draws the material into the chute 8 or otherwise into engagement with the harvested forage HF, reference is made to FIG. 5. There, the fan 6 is included in or forms part of the chute 8. The fan 6 can be driven by a drive shaft 6S that is run by the engine 3. The driveshaft can rotate blades inside the housing 6H of the fan. Optionally, the housing can define an intake opening 6O, with which the tube 48 is in communication at the input port 49. To utilize the vacuum V in the fan and chute in general, the applicator system optionally can include a restrictor plate 49R. The restrictor plate can close or cover all or a portion of the opening 6O of the fan. The restrictor plate can be joined to the housing with fasteners 49F around a perimeter of the opening 6O. The restrictor plate can define a slot 6L so that the plate can fit over and around the drive shaft 6S without having to remove the shaft or disassemble the fan 6. The plate generally can focus the vacuum V through the input port 49 rather than through the entire opening 6O to draw a potentially higher vacuum through the port to draw the material 100 into the fan and chute. The plate can include a nipple 49N at the input port 49. The nipple or connector 49N can connect directly to the tube 48 adjacent the bin. Thus, the vacuum V generated by the fan in the chute and fan optionally can be drawn through the plate, through the port and connector and in the tube 48 to draw the material through the tube and into the chute.

With reference to FIGS. 1-4, the system 10 can include a container, box or bin 20 that is mounted on the harvester 1. Optionally, this box 20 can be mounted on a platform 1P that is adjacent the operator cab 4 of the harvester 1. The bin 20 can include a cover (not shown) to prevent precipitation or other elements from entering the interior 20I of the bin. The bin can be selectively sized to accommodate a given amount of treatment material 100, which, as illustrated, is a granular treatment material in dry and flowable form. The bin 20 can include a top 20T which can include an opening through which the treatment material is loaded into the bin. The bin can include walls 20W and optionally slanted walls 20SW below the walls 20W near the bottom 20B. The slanted walls 20SW can convey the material, which can be gravity fed along those walls toward an auger 30. The bin and walls can be constructed from a suitable material, such as metal, composites, polymers and the like. The bin 20 can include legs 20L that support it on the platform 1P or other surface upon which the bin is placed.

As shown in FIG. 2, the bin can define an exit opening 22 adjacent the location where the slanted walls 20SW converge, optionally at the end of the auger 30. This way, the auger can auger or otherwise convey material to the exit opening 22. The bin also can include a capture funnel 24 disposed adjacent and optionally under the exit opening 22. The material 100, when augered through the exit opening, effectively dumps into the capture funnel 24 and into tube 48 as described in further detail below.

The auger 30 can include a shaft 33 that is rotatably mounted in the bottom 20B the bin 22. The auger can convey granular treatment material in the bin, adjacent the sidewalls, toward the exit opening 22 defined by the bin. The shaft 33 and the auger in general can include a helical fin 34, which extends outward and radially from an axis LA of rotation of the shaft 33. This helical fin 34 can be substantially helical as shown, or can be generally helical, not following a perfect helix, depending on the application. Also, although shown as a continuous fin, the helical fin can be interrupted in some locations along the shaft but still considered a helical fin. Further, the helical fin 34 can be discontinuous, formed of a plurality of tabs or paddles generally oriented in a helical configuration along the shaft and auger in general.

As illustrated, the auger 30 and its shaft 33 are configured in a substantially horizontal configuration, optionally with a slight downward angle toward the exit opening 22. In this configuration, the auger advances material along a horizontally oriented helical path, which as shown leads toward the exit opening 22 defined by the bin 20. Although shown in the bottom of the bin, the auger 30 of course can be moved to different portions of the bin, depending on the application and the material used. It also can be slanted relative to the sidewalls and the slanted walls, again depending on the particular application.

As mentioned above, the granular treatment material 100 feeds the auger 30 under the force of gravity. In so doing, the material slides down and/or along the sidewalls 20W as well as the slanted walls 20SW toward the auger. The helical fin acts as a paddle to capture and convey the material toward the exit opening 22 of the bin. Optionally, along a helical path, the ends 31 and 32 of the shaft 33 can optionally extend through the walls of the bin.

The end 32 of the shaft 33 opposite the exit opening 22 of the bin can protrude beyond the bin 20 as shown in FIG. 3. There, the end 32 of the shaft can be coupled via a connector 36 to a motor 38. The connector 36 can be in the form of a set of gears, chains, sprockets and the like. Optionally, as shown the connector 36 is in the form of a Lovejoy connector, also referred to as a Lovejoy coupler, available from Lovejoy, Inc. of Downers Grove Ill. This coupler can include two opposing hubs that have teeth configured to engage a spider element that mounts between the hubs and separates the hubs. The hubs can be mounted on a motor shaft and the auger shaft via sets of respective splines. With this type of connector, the motor 38, which optionally can be an electric, hydraulic, pneumatic or other type of motor, can be readily replaced quickly and easily relative to the auger and the shaft. Of course, other types of connectors can be utilized.

The motor 38 can be run off a battery or other power source on board the harvester 1. The motor supplies the rotational force and torque to rotate the shaft 32, which in turn rotates the remainder of the auger 30 to convey the material 100 in the bin 20 out of the bin. The motor 38 can be electrically coupled to a controller 50 of the system 10 which can be mounted in the operator cab 4 of the harvester 1, in plain view of the operator O.

The motor can operate at a variety of speeds and/or output. The speed of the motor 38 can be controlled via the controller 50. In particular, the controller 50 can include an actuator 52 that can be adjusted or otherwise altered, which in turn changes the voltage or other power provided to the motor 38. This can change the speed of the motor. As a result, the revolutions per minute (RPM) of the auger 30 can be altered. With the alteration of the rotation and RPM of the auger, the amount of material conveyed out the opening 22 from the bin 20 can be altered. This, in turn, can change the amount of material fed into the tube 48 and ultimately applied to the harvested forge HF material as described in further detail below.

Although shown as being electrically coupled via a wire to the controller 50, the motor 38 optionally can be controlled by the motor via a wireless connection, such as Bluetooth, Wi-Fi or some other communication means. As illustrated, the controller 50 can include a rotatable knob type manual actuator 52. This actuator can be rotated in the directions shown by the arrow adjacent the actuator in FIG. 3 to alter the voltage or other power provided to the motor 38. Again, by adjusting this voltage or other power to the motor 38. The motor's output changes, so the RPM of the auger and its components changes. Optionally, the illustrated rotatable knob actuator 52 can be replaced with a sliding switch, a lever, a combination of up down buttons or other types of switches or actuators, depending on the application and preference of the operator.

The controller 50 also can include or can be associated with a display 50D. The display 50 can output visible indicia 50I to the operator O while the operator O is inside the cab 4 operating the harvester 1. As illustrated, this indicia 50I is representative of an RPM of the auger 30 which can be associated with a first signal provided via the sensor 40, as described further below. Optionally, this RPM can be output on the display 50D in alphanumeric form, and for example, in numerals. Of course, depending on the language, units of measurement, etc., the alphanumeric output can be altered. It is to be noted that an operator O within the cab 4 of the harvester 1 can have within their field of view inside the cab the display 50D and the machine display 8D, so the operator can view both the indicia 8I, optionally in the form of the measured harvest forage rate and the indicia 50I, optionally in the form of RPM of the auger nearly simultaneously or by simply shifting their view slightly within the cab 4.

Figure 4:
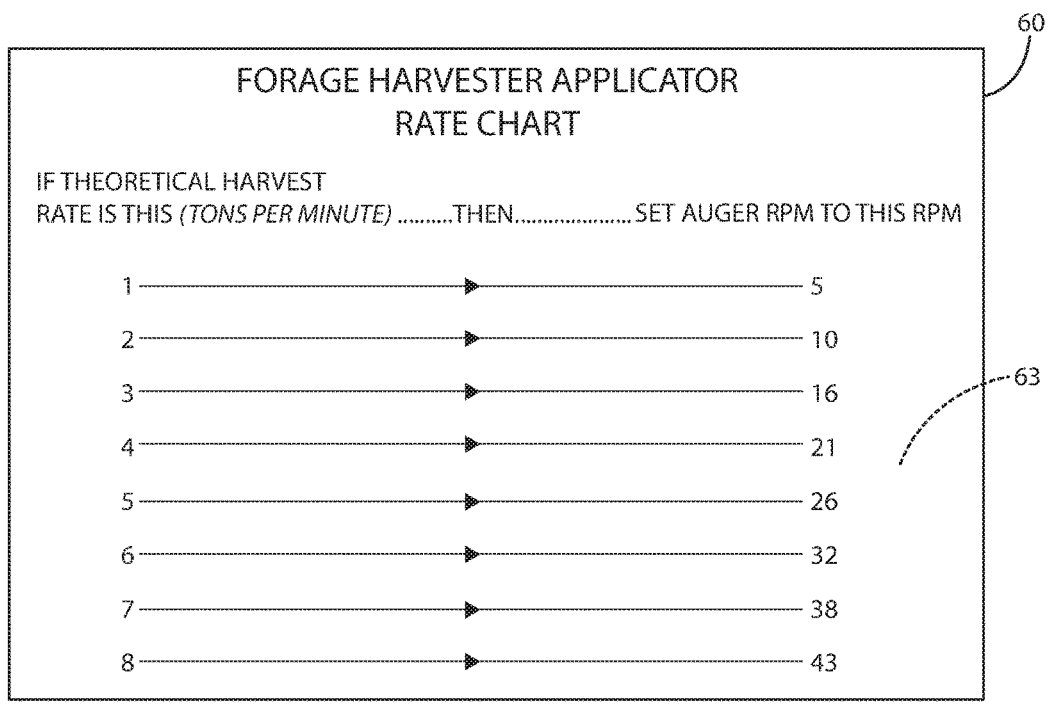
FIG. 4 is a chart that associates a set of RPMs with a corresponding set of theoretical harvested forage rates for display in a forage harvester to an operator.

The system also can include a chart 60, which can be visible to the operator when the operator is in the cab 4 operating the harvester 1. In its simplest form, the chart can be a sticker with an adhesive 63 backing that secures the chart to a surface within the cab 4. The chart can correlate multiple theoretical harvest forage harvest rates to multiple auger RPM to dispense the precise and accurate amount of treatment material 100 from the system 10 to the harvested forage HF. A particular example of the chart is illustrated in FIG. 4. There, the chart 60 can present a plurality of theoretical harvest rates, in particular amounts per time unit, for example, in tons per minute. Based on a set of calculations, each of the respective theoretical harvest rates are calibrated to a corresponding RPM of the auger 30 so that an appropriate amount of treatment material 100 can be applied to harvested forage HF. As an example, if the theoretical harvest rate is 3 tons per minute, then setting the auger at 16 RPMs should result in the application of the precise amount of treatment material 100 to the harvested forage, optionally in the chute 8. The precise amount of treatment material will be sufficient to adequately treat the harvested forage HF. Setting the auger 30 to different RPM, for example, a lesser RPM will result in a decreased application of the treatment material 100 to the harvested forage HF. Setting the auger 30 to a greater RPM will result in an increased application of the treatment material 100 to the harvested forage HF. By setting the RPM appropriately, the proper amount of treatment material 100 can be applied to the harvested forage HF, without wasting it by applying too much to increase the overall cost of the material, and without under applying it so that the harvested forge material is not properly treated.

As shown in FIG. 3, the system 10 can include a sensor 40. Optionally, the sensor 40 can be disposed adjacent the shaft 33 of the auger, for example, adjacent the end 32 of the shaft extending outside the bin 20, generally between the bin in the motor 38. This sensor 40 optionally can be in the form of a tachometer capable of measuring the rate of rotation of the shaft 32, and generally the auger 30 about the axis LA. The sensor 40 can be powered by the same power source as the motor 38, or can be a passive sensor. The sensor can generate a signal and send, transmit or otherwise transfer that signal to the controller 50. Again, this transfer of the signal can be along a hard wire as shown, or can be done wirelessly, depending on the application. The controller 50 can include processor that can process the signal and output the signal as indicia 50I on the display 50D. As an example, the indicia can be representative of an RPM associated with the first signal corresponding to the rotation sensed by the sensor 40. Although a tachometer is contemplated, other types of devices capable of measuring rotation can be substituted therefor. The sensor also can be located in other positions relative to the shaft. It can be proximal the shaft and/or can detect rotation of the shaft magnetically. In some cases, the sensor can be mounted inside the controller 50 or somewhere else distal from the bin 20 still measure rotation of the auger and thus can generate a signal representative of the RPM of the auger. The sensor 40 also can be integrated in the motor 38 to sense the rotation of the shaft 32 and auger 30.

The system 10 can be mounted on the harvester 1 such that material 100 dispensed from the bin 20 enters the optional capture funnel 24. For example, the material 100 can be augered out the end opening exit opening 22 and dumped into the funnel 24. Capture funnel 24 can be connected to a tube 48. This tube 48 can be a polymeric or metal, flexible or rigid or other type of tube capable of conveying particulate material therethrough. The tube 48 can extend away from the bin 20, under at least a portion of the operator cab 4, optionally over a portion of the wheels of the forage harvester 1 and can be in fluid communication with the chute 8. The tube 48 can intersect or otherwise be joined with the fan and/or chute 8 under the operator cab 4, between the opposing wheels of the harvester and behind the chopper head 5, optionally between the chopper head 5 and the fan 6 of the harvester 1. As mentioned above, the vacuum V present in the chute 8 can pull the granular treatment material 100 that enters the tube 48 toward the flow of harvested forage HF moving in the chute 8 so that the granular treatment material can be mixed with the harvested forage. In particular, the granular treatment material is pulled into the chute and dispersed in the harvested forge material as the material passes the input port 49, where the tube 48 connects to the chute 8. The treatment material 100 can be sprinkled or sprayed into, or otherwise mixed in and with the harvested material and dispersed throughout it as the material and the forage continue to flow and tumble and intermix through the remainder of the machine. By the time the harvested forge material reaches the ejector chute 7 and is ejected out of the chute into another container T, the treatment material 100 is adequately mixed with and throughout the forage HF to provide desired effect of treatment of the harvested forage.

Operation of the agricultural forage treatment applicator system 10 will now be described with reference to FIGS. 1-4. On a high level, the operation can follow a method including: harvesting forage; rotating an auger in a bin to convey a granular treatment material toward a tube; moving the material through the tube with a vacuum toward harvested forage to mix the material with the harvested forage; sensing rotation of the auger; displaying an RPM associated with the sensed auger rotation; displaying a measured harvested forage rate; and adjusting the actuator to change the RPM to match the applied material amount to the harvested forage based on the measured harvested forage rate.

More particularly, with reference to FIG. 1, a motorized forage harvester 1 can propel itself under its own power along the ground G of a field having a stand of forage F. As the harvester moves, it harvests the forage F with the chopper head 5. Harvested forage HF is drawn into and through the chute 8. A vacuum V is provided via a vacuum source, which optionally can be a fan 6 rotated by an engine 3 that also propels the body 2 and the harvester in general along the ground G. The vacuum V in the chute, optionally generated by the fan or some other vacuum source, draws the harvested material HF through the machine until it is passed through an ejector chute 7. Harvested material HF is ejected from the ejector chute along a trajectory into a container T that is distal from the harvester 1. The container T can be in the form of a trailer towed by a truck T1 in the field.

As the harvested forage material HF travels in the chute 8 and passes by sensor 8S, the sensor measures the flow and/or rate at which the forage is being harvested. A signal is sent to the machine controller 1C. The machine controller includes a processor that utilizes software to analyze the signal and associated data. The controller outputs indicia 8I on the display 8D within the cab 4 to the operator O. This indicia displayed to the operator in the operator cab is representative of a measured harvested forage rate of forage material HF harvested by the harvester 1.

The system 10 can be in full operation during the harvest activity, as the harvester moves and harvests the forage F. The bin 20 contains a supply of treatment material 100 such as those described herein. Power is provided by a power source on board the harvester 1 to the motor 48 of the system. The motor rotates auger 30 disposed in the bottom of the bin. The auger, its shaft, and its helical fin rotate in the bottom of the bin. The treatment material 100 is fed by gravity, traveling downward toward the bottom, optionally funneled by the slanted walls 20SW toward the augered 30. The motor rotates the auger and the auger augers the granular treatment material in the bottom of the bin toward the exit opening 22 defined by the bin 20. This material can travel along a horizontally oriented, helical path. The treatment material 100 exits the exit opening 22 and is dumped into or otherwise enters the capture funnel 24 as shown in FIG. 2. At this point, the treatment material trickles into or otherwise falls into or enters the tube 48. Because the tube is in communication with a vacuum V, the granular treatment material 100 is pulled under vacuum toward the harvested forage HF as it moves within the chute 8. Under the force of that vacuum, the treatment material enters the chute 8 and becomes mixed with the harvested forage HF. As the harvested forage HF continues through the machine and out the ejector chute 7, the material and harvested forge thoroughly mix with one another so that the treatment material is dispersed within the harvested forage HF by the time it is shot along a trajectory and/or dumped into the container T.

As the auger rotates, the rotation of it and the shaft is sensed by the sensor 40. The sensor 40 generates a first signal in response to the sensing. The sensed signal is received by the controller 50 disposed in the operator cab 4. A processor in the controller 50 converts the signal to a first RPM. The first RPM is associated with the first signal. The controller 50 then displays a first indicia 50I on a first display 50D mounted generally on or adjacent the controller 50. This first indicia 50I can be representative of the first RPM and can be displayed as a first RPM in an alphanumeric form. As mentioned above, the display 8D can display a second indicia 8I that is representative of the measured harvested forage rate as an amount harvested per unit of time, optionally in alphanumeric form as well.

Based on the displayed first indicia and the second indicia, the operator O inside the cab 4 can review the chart 60 and the values in that chart as shown in FIG. 4. From there, the operator can adjust the actuator 52, for example, by rotating it or otherwise moving it. This in turn changes the voltage or power supplied to the motor 38, which in turn adjusts the RPM. As an example, the actuator can change the first RPM measured by the sensor to a second RPM so the auger 30 applies a different amount of granulated granular treatment material based on the second indicia representative of the measured harvested forage rate displayed on the display 8I.

As a more particular example, an operator O in the cab 4 can review and view the first display 50D and the RPM displayed on the display as indicia 50I. As shown in FIG. 3, this first sensed RPM can be 13 RPM. The operator can nearly simultaneously view the display 8D and view the associated measured harvested forage rate displayed as indicia 8I. As an example, that indicia 8I may be 2.8 tons per minute, which means that the harvester 1 is harvesting approximately 2.8 tons per minute. At this particular rate of harvest, a particular amount of treatment material can be applied to the harvested forage HF moving in the chute 8 so that harvested forage is adequately preserved when later stored.

This particular amount of material and rate of addition to the harvested forage in the chute 8 can be correlated to a specific RPM of the auger shaft that conveys the granular material to the chute and thus the harvested forage HF. Accordingly, the operator O can refer to the chart 60 displayed or otherwise in view of the operator in the cab 4. When the operator refers to the chart 60 as shown in FIG. 4, the operator first compares the measured harvested forage rate displayed, 2.8 tons per minute, to the theoretical harvest rate shown in the left column of the chart 60. The closest theoretical harvest rate to 2.8 tons per minute is 3 tons per minute in the chart 60. Referring to the chart, the operator can see that the auger can be set at 16 RPM to apply an appropriate corresponding amount of treatment material to the harvested forage HF. Accordingly, the operator adjusts the actuator on the controller 50. In so doing, the voltage supplied to the motor 38 can increase, in which case the motor turns the shaft faster, so the RPM of the shaft measured by the sensor also increase. The sensor then sends that new second signal related to the increased RPM to the controller, which then displays the second RPM as indicia on the display 50D.

Optionally, the operator O can incrementally increase the RPM until the RPM displayed on the display 50D are at about 16 RPM. That RPM corresponds to the measured harvested forage rate within an allowable margin of error. In some cases, this operation can be automated so that the controller 50 compares the RPM sensed by the sensor 40 to the measured harvested forage rate sensed by the sensor 8S, and automatically adjusts the actuator 52 of the controller to selectively change from one RPM to another. This can be accomplished by the processor running software and calculating a suitable adjustment, then altering operation of the motor accordingly, optionally based on further feedback from the sensor.

Depending on the sensed RPM and the measured harvested forage rate, the changing of the RPM by adjustment of the controller 50 can make the auger 30 apply a greater amount of the granular treatment material 100 to the harvested forage HF with the second RPM than with the first RPM, or can make the auger apply a lesser amount of the granular treatment material to the harvested forage with the second RPM than with the first RPM.

During continued harvest, conditions may change. For example the density of the forage F may be altered, or the harvester 1 may run differently. As those conditions change, the measured harvested forage rate on the display 8D and sensed by the sensor 8S can change. The operator can monitor this rate as the harvest is ongoing. If the measured harvest rate changes up or down, the operator O can view the RPM and the chart 60 visible in the cab. If the measured harvest rate differs from the theoretical harvest rate, for example, the measured harvest rate jumps from 2.8 to 6 tons per minute, the operator can then refer to the chart 60 and see that the closest theoretical harvest rate is 6 tons per minute. Thus, the RPM of the auger can be changed to a corresponding 32 RPM. Accordingly, the operator can actuate the actuator 52 until the RPM displayed on the display 50D are 32 RPM. When harvesting a particular field, the operator might change the RPM of the auger and the system 10 as a whole multiple times due to varying conditions. This, however, can lead to significant reduction in waste of the treatment material and to a precise application of the treatment material so that the harvested forage HF is adequately treated and its value is preserved.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method of using an agricultural forage treatment applicator system to deliver a granular treatment material to forage during harvesting, the method comprising:

harvesting forage from a field with a motorized forage harvester as the harvester moves in the field under power provided by a motor of the motorized forage harvester;

providing a vacuum and conveying harvested forage through a chute, the motorized forage harvester having an operator cab, within which an operator is located, disposed above the chute;

providing a bin mounted on the motorized forage harvester;

rotating a helical auger having a shaft rotatably mounted in a bottom of the bin to convey a granular treatment material in the bin toward an exit opening defined by the bin;

transferring the granular treatment material to a tube;

moving the granular treatment material through the tube with the vacuum toward a harvested forage moving in the chute so that the granular treatment material mixes with the harvested forage;

sensing with a sensor a rotation of the shaft as the shaft rotates to generate a first signal;

providing a controller in the operator cab, the controller including a manually adjustable actuator, the controller in communication with the sensor;

displaying a first indicia to the operator in the operator cab representative of a first RPM associated with the first signal;

displaying a second indicia to the operator in the operator cab representative of a measured harvested forage rate of forage material harvested by the motorized forage harvester;

adjusting the actuator of the controller to selectively change the first RPM to a second RPM so that the auger applies an amount of the granular treatment material to the harvested forage based on the second indicia representative of the measured harvested forage rate displayed inside the cab to the operator.

2. The method of claim 1, comprising:
displaying the first indicia representative of a first RPM as a first RPM in alphanumeric form;
displaying the second indicia representative of the measured harvested forage rate as an amount harvested per unit of time in alphanumeric form.

3. The method of claim 2 comprising:
correlating the measured harvested forage rate in alphanumeric form to the second RPM before adjusting the actuator.

4. The method of claim 3,
wherein the second RPM is displayed in alphanumeric form on a chart in the cab viewable by the operator as the motorized forage harvester moves along the ground,
wherein the second RPM is associated with a theoretical harvest forage rate different from the measured harvest forage rate.

5. The method of claim 4,
wherein the first indicia representative of the first RPM is displayed on a first display joined with the controller,
wherein the second indicia representative of the measured harvested forage rate is displayed on a second display that is separate and mounted distal from the first display in the operator cab.

6. The method of claim 5,
wherein the second indicia representative of the measured harvested forage rate is displayed in tons per minute of harvested forage material to the operator in the cab.

7. The method of claim 1,
wherein the granular treatment material includes sand mixed with a preservative,
wherein the sand and the preservative moves through the tube under the vacuum until the sand and preservative collide with the harvested forage moving in the chute.

8. The method of claim 7 comprising:
conveying the harvested forage with the sand and the preservative from the motorized forage harvester under force along a trajectory through the air toward a container distal from the motorized forage harvester.

9. The method of claim 1,
wherein the sensor is a tachometer placed adjacent the shaft to sense the first RPM,
wherein the bin is positioned on a platform adjacent the operator cab,
wherein the granular treatment material feeds toward the auger under the force of gravity,
wherein the auger augers the granular treatment material in the bin toward the exit opening defined by the bin along a horizontally oriented helical path,
wherein the granular treatment material travels through the tube from the bin, under the operator cab and to the chute.

10. The method of claim 1,
wherein the changing of the first RPM to a second RPM makes the auger apply a greater amount of the granular treatment material to the harvested forage with the second RPM than with the first RPM.

11. The method of claim 1,
wherein the changing of the first RPM to a second RPM makes the auger apply a lesser amount of the granular treatment material to the harvested forage with the second RPM than with the first RPM.

12. A method of using an agricultural forage treatment applicator system to deliver a granular treatment material to forage during harvesting, the method comprising:
harvesting forage from a field with a forage harvester as the harvester moves;
rotating an auger in a bin having a shaft to convey a granular treatment material in the bin toward an exit opening defined by the bin;
moving the granular treatment material through a tube with the vacuum toward a harvested forage moving in a chute so that the granular treatment material mixes with the harvested forage;
sensing with a sensor a rotation of the shaft as the shaft rotates to generate a first signal;
providing a controller in an operator cab of the harvester, the controller including a manually adjustable actuator, the controller in communication with the sensor;
displaying a first RPM associated with the first signal to the operator in the operator cab;
displaying a measured harvested forage rate of forage material harvested by the forage harvester to the operator in the operator cab;
adjusting the actuator of the controller to selectively change the first RPM to a second RPM different from the first RPM so that the auger applies an amount of the granular treatment material to the harvested forage based on the measured harvested forage rate displayed inside the cab to the operator.

13. The method of claim 12, comprising:
displaying a chart to the operator in the cab, the chart including a plurality of RPMs associated with a plurality of theoretical harvest forage rates,
wherein the operator manually adjusts the actuator based on a review of the chart to match the measured harvested forage rate to a closest theoretical harvest forage rate from the plurality of theoretical harvest forage rates.

14. The method of claim 12, comprising:
displaying the first RPM on a first display on the controller; and
displaying the measured harvested forage on a second display mounted distal from the controller and the first display.

15. The method of claim 12,
wherein the sensor is a tachometer placed adjacent the shaft to sense the first RPM,
wherein the bin is positioned on a platform adjacent the operator cab,
wherein the granular treatment material feeds toward the auger under the force of gravity,
wherein the auger augers the granular treatment material in the bin toward the exit opening defined by the bin along a horizontally oriented helical path,
wherein the granular treatment material travels through the tube from the bin, under the operator cab and to the chute.

16. An agricultural forage treatment applicator system for delivering a granular treatment material to forage during harvesting, the system comprising:
a gravity fed bin having at least one side extending to a bottom, and defining an exit opening, the bin configured to store a supply of granular treatment material, the bin configured to be mounted on a motorized forage harvester;
an auger disposed in the bottom of the bin, the auger having a shaft and a helical fin extending adjacent the shaft, the auger configured to rotate about an axis at a first RPM and auger the granular treatment material with the helical fin out the exit opening of the bin;

a motor joined with the shaft and configured to rotate the shaft about the axis at the first RPM;

a tube extending from a location adjacent the exit opening to a vacuum source generated by the motorized forage harvester, the vacuum source configured to draw a vacuum and pull the granular treatment material dumped out the exit opening of the bin toward a flow of harvested forage so that the granular treatment material can be mixed with the harvested forage;

a sensor mounted proximal the shaft of the auger to sense rotation of the shaft as the motor rotates the shaft about the axis and generate a first signal corresponding to a first RPM;

a chart, viewable from an operator inside a cab of the motorized forage harvester, that correlates a second RPM, different from the first RPM, to a corresponding theoretical forage harvest rate;

a controller configured to be mounted in the cab, the controller including a display, the controller receiving the first signal from the sensor relating to the first RPM, the controller outputting the first RPM in alphanumeric form on the display in the cab to the operator; and a manually adjustable actuator joined with the controller, the actuator movable to a setting to selectively adjust the motor joined with the shaft of the auger so that the first RPM changes to the second RPM that is different from the first RPM, wherein the sensor is configured to sense rotation of the shaft at the second RPM and the controller is configured to receive a second signal from the sensor corresponding to the second RPM and output the second RPM in alphanumeric form on the display in the cab to the operator, whereby the operator can adjust the actuator to alter an RPM of the auger shaft to apply a predetermined amount of the granular treatment material to the harvested forage based on a measured harvest forage rate displayed inside the cab.

17. The system of claim 16, wherein the sensor is a tachometer placed adjacent the shaft, wherein the bin is positioned on a platform adjacent the operator cab, wherein the granular treatment material feeds toward the auger under the force of gravity, wherein the auger augers the granular treatment material in the bin toward the exit opening defined by the bin along a horizontally oriented helical path, wherein the granular treatment material travels through the tube from the bin, under the operator cab, wherein the motor is joined with the shaft via a lovejoy connector.

18. The system of claim 16, wherein the tube extends from the bin, under the operator cab and to a chute through which the forage material travels.

19. The system of claim 16, wherein the at least one side includes two opposing slanted sidewalls that converge toward the auger and an end wall defining the exit opening, wherein the bin includes a funnel mounted adjacent the exit opening to collect and to convey augered granular treatment material exiting the exit opening toward the tube.

20. The system of claim 16, wherein the motorized forage harvester includes an engine, a body driven by the engine, a cutting head forward of the body, and an ejector that propels the harvested forage and granular treatment material from the motorized forage harvester under force along a trajectory through the air toward a container distal from the motorized forage harvester.

* * * * *